Aug. 29, 1967  E. L. GAYLOR  3,338,486
LIFTING DEVICE

Filed April 26, 1966  2 Sheets-Sheet 1

INVENTOR
EARL L. GAYLOR

BY

*Pennie, Edmonds, Morton, Taylor and Adams*
ATTORNEYS

Aug. 29, 1967  E. L. GAYLOR  3,338,486
LIFTING DEVICE

Filed April 26, 1966  2 Sheets-Sheet 2

INVENTOR
EARL L. GAYLOR
BY
ATTORNEYS 3,338,486
LIFTING DEVICE
Earl L. Gaylor, Upper Montclair, N.J.
(290 Central Ave., Orange, N.J. 07050)
Filed Apr. 26, 1966, Ser. No. 545,341
7 Claims. (Cl. 224—49)

ABSTRACT OF THE DISCLOSURE

A lifting device for supporting and transferring a roasted fowl, meat or other cooked food item from a roasting pan to a serving platter comprising two separate support members and two separate handles, one of which is releasably connected to one end of each of the support members and the other of which is releasably connected to the other end of each of the support members.

In the past, many devices have been devised for aiding the cook or housewife in removing the cooked fowl, such as a roasted turkey or roast from the oven and onto a serving platter. These devices, however, have certain disadvantages relating to difficulty in cleaning, injury to the cooked food, and non-adjustability of the device hindering its use for different sized fowl or roasts. For example, some lifting devices are comprised of intricately formed grillwork with permanently attached handles. Devices of this character inherently have many areas and crevices in which food particles readily become lodged and once these food particles are baked onto the device during the roasting, they are quite difficult to remove.

Other lifting devices require an impaling or piercing of the fowl or roast to effect a lifting engagement therewith. This obviously detracts from the esthetic appearance of the fowl or roast after it is placed on the serving platter and the device removed. In addition, devices of this type are not particularly well suited for lifting heavy or well done fowl or roasts because they do not support the fowl or roasts from underneath and therefore do not lend complete support as the food is being transferred from the roasting pan to the platter. If the food is heavy or well done, lifting with this type of device may cause the device to rip through the food thus removing all support and letting the food drop in the process.

Still other lifting devices, as well as those described above, are not particularly suited for removal once the transfer to the serving platter has been completed without trauma to the fowl or roast or considerable manipulation thereof. Where, for example, the lifting device includes impaling tines on which the fowl or roast sits, it is necessary to physically lift the food off the lifting device before the latter can be removed, thus subjecting the fowl or roast to possible trauma with the result of spoiling its esthetic appearance. Also, lifting devices with permanently joined handles presenting uneven or irregular surfaces and edges or devices with any uneven dimensions tend to injure the fowl or roast where one attempts to remove it from its underlying position on the platter by sliding it out from underneath. As the sliding occurs, the uneven or irregular parts of the device tend to dig into the food; and in the case of fowl, such as roasted turkey, such uneven parts tend to rip the skin away from the meat.

In accordance with the teachings of the present invention, a lifting device is constructed in such a manner whereby the disadvantages of prior devices as described above are avoided. The lifting device of the present invention is particularly suited for completely supporting and transferring roasted fowl and roasts of varying sizes without any danger that the device will become loose from the food during the transfer from the roasting pan to the serving platter and without causing trauma to the fowl or roast during such transfer. In addition, the lifting device of the present invention permits definitive placement of the food on the platter and the device may be easily removed without requiring any shaking, sliding or other maneuvering of the food and without necessitating a repositioning of the food or fowl after the device has been removed.

Generally, the lifting device of the present invention is comprised of two elongated support members and two handle members adapted to be removably attached to the supports. Each of the supports and each of the handles are of identical construction and each of the individual parts are made as single elements of simple contour. The supports are adapted to be oriented with respect to each other in either of two adjusted positions while the handles are each provided with a pair of grasping ends adapted to be releasably attached to the ends of the supports when the latter are disposed in either of their adjusted positions.

A more detailed description of the lifting device is made below with reference to the accompanying drawings of which:

Figure 1:
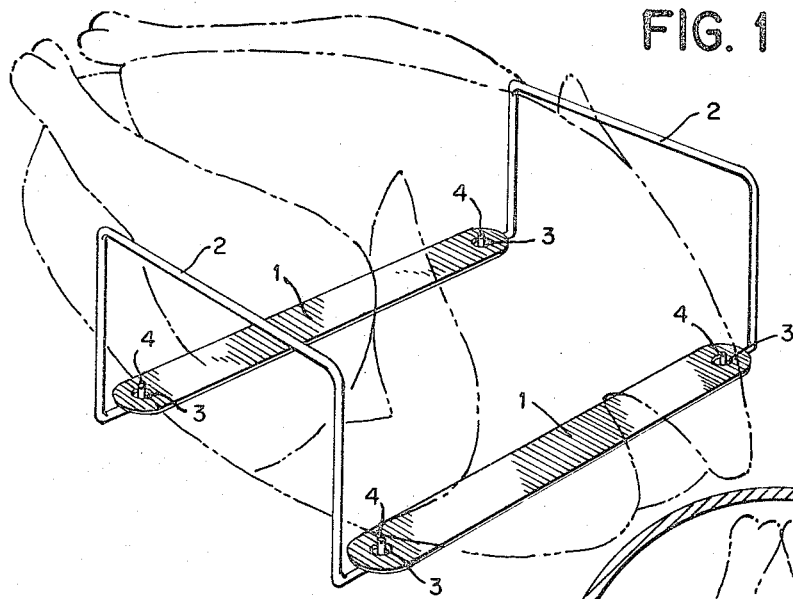
FIG. 1 is a perspective view of the lifting device supporting a fowl.

Referring first to FIG. 1, the lifting device of the present invention is shown as being comprised of two identically constructed support members 1 and two identically constructed handles 2. The supports are constructed of thin, flat, flexible material such as tempered steel. At each end of the supports is a single attaching hole 3 for receiving one of the support grasping ends 4 of the handles.

The handles are each constructed of rigid wire formed into a U-shape for easy grasping and with each of the support grasping ends 4 themselves formed into a squared U-shaped configuration for holding the support members. As shown in the drawings, the legs of the U-shaped ends 4 are spaced apart by a distance greater than the spacing of the holes 3 relative to the ends of the support members. With this squared U-shaped configuration of the ends 4, the support members will sit on the handles without binding as would otherwise tend to occur if these ends were formed as a smooth curve.

Figure 2:
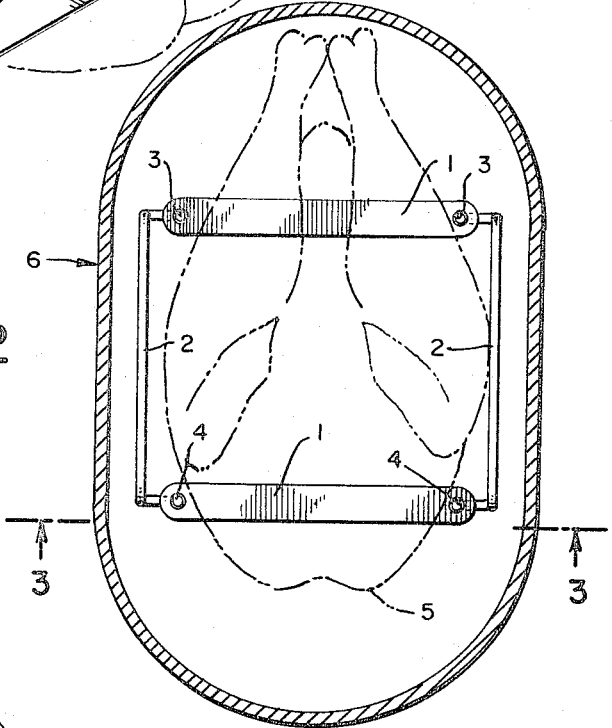
FIG. 2 is a plan view of the lifting device positioned in a roasting pan underneath a large fowl with the support members oriented for receiving this size of bird.
Figure 3:
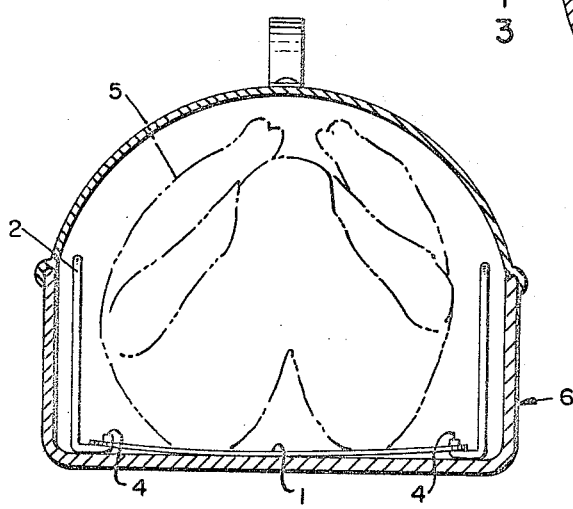
FIG. 3 is a cross-sectional view taken along lines 3—3 of FIG. 2.

With the lifting device constructed of four separate parts, no assembly operation is necessary in its manufacture; and with all surfaces being either flat or rounded, there are no areas in which food particles may become lodged and baked in during the roasting of the fowl or roast so as to present any serious problem of cleaning.

Where it is desired to use the lifting device for a rather large fowl such as shown at 5 in FIG. 2, the individual supports 1 are arranged in parallel relationship to each other and the handles attached as shown. The device may then be readily placed within a roasting pan 6 with the fowl positioned on top. Due to the flexible nature of the supports, they easily orient themselves within the roasting pan; and due to the pivotal connection of the handles, they may, if necessary, be folded over the food so as not in interfere with the roasting pan cover.

Figure 4:
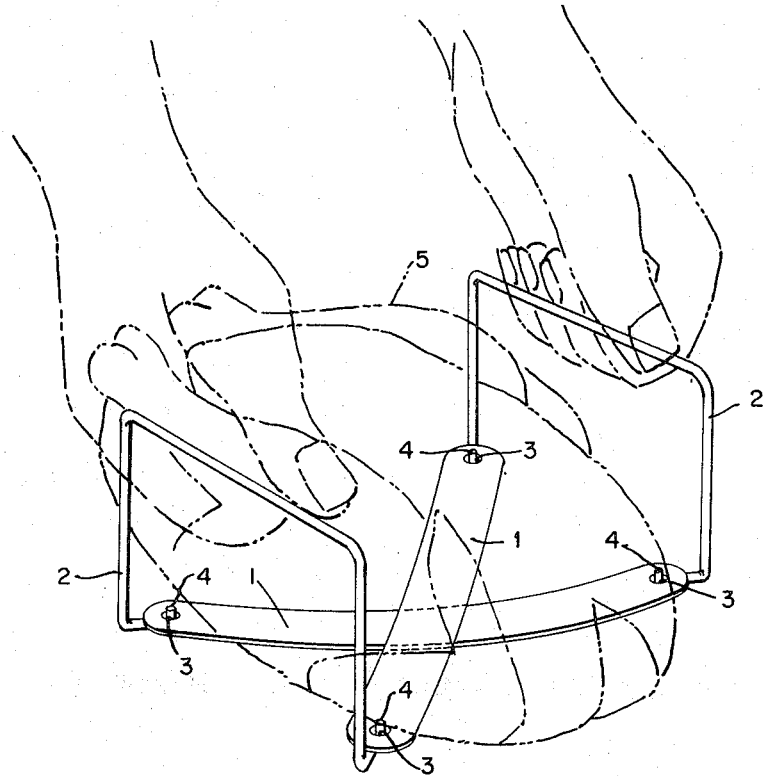
FIG. 4 is a plan view of the lifting device with the support members arranged for supporting a smaller sized fowl.

The lifting device of the present invention is not only adaptable for supporting and transferring large sized fowl; but is equally as well suited for smaller sized fowl or roasts. As shown in FIG. 4, the support members, instead of being oriented parallel to each other, may be arranged in an X configuration to provide more of a central support for the smaller item.

With either arrangement of the support members, the fowl or roast may be lifted from the roasting pan by grapsing and lifting the handles 2. As the weight of the fowl is transferred completely to the support members, the latter flex into a cradle shape as, for example, shown in FIG. 4, to fully support and contain the fowl against falling.

Figure 5:
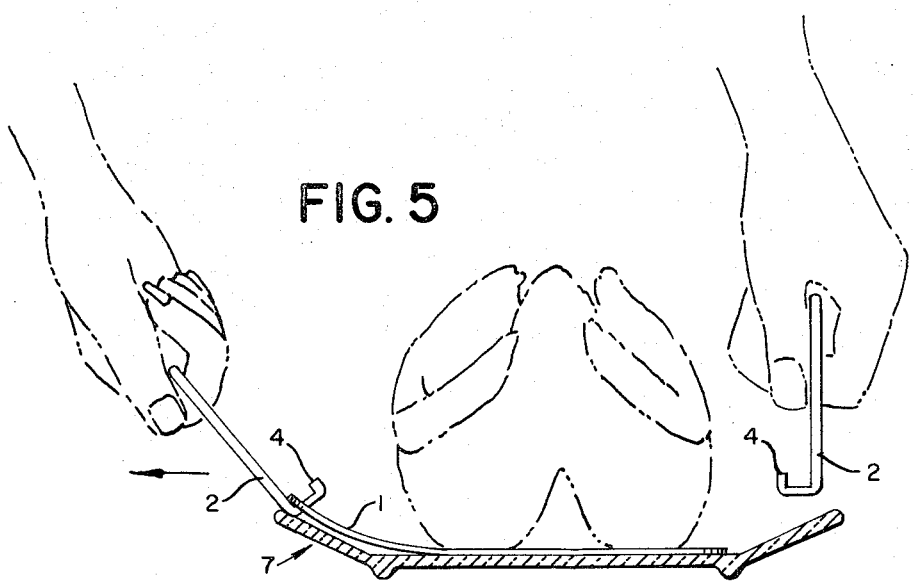
FIG. 5 is a view showing the lifting device being withdrawn from underneath the fowl as it lays on a serving platter.

Once the fowl has been positioned on a suitable serving platter such as shown at 7 in FIG. 5, the lifting device may be removed without trauma to the fowl and without requiring any lifting of the fowl. Such removal is effected by bending one of the ends of the support members and removing them from the ends 4 of one of the handles by means of a fork or other suitable means. The remaining handle is then used to slide the attached supports from under the fowl; and due to the thin, flat shape of the supports, such sliding is possible without ripping or otherwise injuring the fowl.

Although the above description of the present invention is made with reference to the preferred embodiment, it is to be understood that various changes may be made thereto without departing from the scope of the invention as set forth in the following claims.

I claim:
1. A lifting device for supporting and transferring fowl and the like from a roasting pan to a platter comprising:
   (a) a first smooth surfaced support member;
   (b) a second smooth surfaced support member separate from said first support member;
   (c) a first rigid handle having a pair of spaced support grasping ends each of which is releasably secured to one of said support members by attachment thereto adjacent one of their ends; and
   (d) a second rigid handle separate from said first handle and having a pair of spaced support grasping ends each of which is releasably secured to one of said support members by attachment thereto adjacent the other of their ends said first and second handles comprising the only means of connection between said first and second support members and the rigidity of the handles being such as to maintain the ends of said support members an approximately fixed distance apart.

2. A lifting device for supporting and transferring fowl and the like from a roasting pan to a platter comprising:
   (a) a first thin, flat elongated support member having a hole extending therethrough adjacent both of its ends;
   (b) a second thin, flat elongated support member separate from said first support member having a hole extending therethrough adjacent both of its ends;
   (c) a first rigid handle having a pair of spaced support grasping ends each of which is releasably secured to one of said support members by attachment thereto through one of said holes; and
   (d) a second rigid handle separate from said first handle and having a pair of spaced support grasping ends each of which is releasably secured to one of said support members by attachment thereto through the other of said holes said first and second handles comprising the only means of connection between said first and second support members and the rigidity of the handles being such as to maintain the ends of said support members an approximately fixed distance apart.

3. A lifting device according to claim 2 wherein:
   (a) each of said support members are constructed of flexible material.

4. A lifting device according to claim 3 wherein:
   (a) the ends of each of said handles are generally U-shaped.

5. A lifting device according to claim 4 wherein:
   (a) said support members extend generally parallel to each other.

6. A lifting device according to claim 4 wherein:
   (a) said support members overlie each other medially thereof in a general X configuration.

7. A lifting device for supporting and transferring fowl and the like from a roasting pan to a platter comprising:
   (a) a first thin, flat elongated support member having a hole extending therethrough adjacent both of its ends and spaced inwardly of said ends by a predetermined distance;
   (b) a second thin, flat elongated support member separate from said first support member having a hole extending therethrough adjacent both of its ends and spaced inwardly of said ends by said predetermined distance;
   (c) a first rigid handle having a pair of spaced support grasping ends each of which is releasably secured to one of said support members by attachment thereto through one of said holes, the ends of said handles having a squared U-shape configuration with the distance between the legs of the U being greater than said predetermined distance; and
   (d) a second rigid handle separate from said first handle and having a pair of spaced support grasping ends each of which is releasably secured to one of said support members by attachment thereto through the other of said holes, the ends of said handles having a squared U-shape configuration with the distance between the legs of the U being greater than said predetermined distance.

References Cited
UNITED STATES PATENTS

| | | | |
|---|---|---|---|
| 1,265,611 | 5/1918 | Clarke | 294—32 X |
| 2,272,314 | 2/1942 | Williams | 224—49 |
| 2,589,423 | 3/1952 | Nadolsky et al. | |
| 3,112,948 | 12/1963 | Burns | 224—45 X |

GERALD M. FORLENZA, *Primary Examiner.*

F. E. WERNER, *Assistant Examiner.*